United States Patent
Cragun et al.

(10) Patent No.: US 8,201,079 B2
(45) Date of Patent: Jun. 12, 2012

(54) MAINTAINING ANNOTATIONS FOR DISTRIBUTED AND VERSIONED FILES

(75) Inventors: Brian J. Cragun, Rochester, MN (US); Cale T. Rath, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 2289 days.

(21) Appl. No.: 10/757,792

(22) Filed: Jan. 15, 2004

(65) Prior Publication Data

US 2005/0160355 A1 Jul. 21, 2005

(51) Int. Cl.
*G06F 17/22* (2006.01)
*G06F 17/24* (2006.01)

(52) U.S. Cl. ........................ 715/230; 715/229

(58) Field of Classification Search .................. 715/512, 715/230, 229
See application file for complete search history.

(56) References Cited

U.S. PATENT DOCUMENTS

| | | | |
|---|---|---|---|
| 5,845,301 A * | 12/1998 | Rivette et al. ................. | 715/512 |
| 5,893,908 A * | 4/1999 | Cullen et al. ..................... | 707/5 |
| 6,519,603 B1 | 2/2003 | Bays et al. | |
| 6,571,295 B1 * | 5/2003 | Sidana .......................... | 709/246 |
| 6,728,760 B1 * | 4/2004 | Fairchild et al. ............. | 709/217 |
| 6,789,109 B2 * | 9/2004 | Samra et al. .................. | 709/220 |
| 6,859,909 B1 * | 2/2005 | Lerner et al. .................. | 715/512 |
| 6,874,140 B1 * | 3/2005 | Shupak ......................... | 717/131 |
| 2002/0133628 A1 * | 9/2002 | Asplund et al. ............... | 709/246 |
| 2003/0196164 A1 * | 10/2003 | Gupta et al. ............... | 715/500.1 |

OTHER PUBLICATIONS

Brush et al.; "Robust Annotation Positioning in Digital Documents", 2001; ACM ; pp. 287-289.*
Kahan et al.; "Annotea: An Open RDF Infrastructure for Shared Web Annotations"; 2001; ACm; pp. 623-632.*
Dettinger et al., IBM U.S. Appl. No. 10/083,075, filed Feb. 26, 2002, "Application Portability and Extensibility Through Database Schema and Query Abstraction".
Chatterjee et al., IBM U.S. Appl. No. 10/600,014, filed Jun. 20, 2003, "Universal Annotation Management System".
Cragun et al, IBM U.S. Appl. No. 10/600,382, filed Jun. 20, 2003, "Heterogeneous Multi-Level Extendable Indexing for General Purpose Annotation Systems".

* cited by examiner

*Primary Examiner* — Doug Hutton, Jr.
*Assistant Examiner* — James Debrow
(74) *Attorney, Agent, or Firm* — Patterson & Sheridan LLP

(57) ABSTRACT

Methods, systems, and articles of manufacture for maintaining annotations for changing source documents are provided. For some embodiments, an annotation system may support multiple policies, with each policy dictating how (or if) an annotation created for a version of a source document should be applied to subsequent versions of the source document. For some embodiments, a user creating an annotation may select from a group of available policies to be applied to the annotation. For some embodiments, policies may be enforced when annotated documents are checked into a content management system used to manage the annotated documents.

20 Claims, 7 Drawing Sheets

| POLICIES FOR MAINTAINING ANNOTATIONS FOR MULTIPLE VERSIONS OF A DOCUMENT | |
|---|---|
| POLICY | DESCRIPTION |
| NO CHANGE | IF A DOCUMENT IS CHANGED, THE ORIGINAL ANNOTATION DOES NOT APPLY TO THE NEW DOCUMENT |
| APPLY ANNOTATIONS TO MULTIPLE VERSIONS | AN ANNOTATION ON AN ORIGINAL DOCUMENT ALSO APPLIES TO A SUBSEQUENT VERSION(S) OF THE DOCUMENT |
| CARRY ANNOTATIONS FORWARD TO NEW VERSIONS | A COPY OF EACH ANNOTATION IS CARRIED FORWARD TO THE MOST ACCURATE POSITION IN SUBSEQUENT VERSIONS OF A DOCUMENT |
| VALIDATION REQUIRED | AN AUTHORIZED USER MUST VALIDATE AN ANNOTATION BEFORE IT IS CARRIED FORWARD TO SUBSEQUENT VERSIONS OF A DOCUMENT |

FIG. 3

MAINTAINING ANNOTATIONS FOR DISTRIBUTED AND VERSIONED FILES

CROSS-REFERENCE TO RELATED APPLICATIONS

The present application is related to commonly-owned U.S. Pat. No. 6,519,603, entitled "Method And System For Organizing An Annotation Structure And For Querying Data And Annotations", commonly-owned, co-pending applications Ser. No. 10/083,075, entitled "Application Portability And Extensibility Through Database Schema And Query Abstraction," Ser. No. 10/600,014, entitled "Universal Annotation Management System", Ser. No. 10/310,192, entitled "Annotation Validation Using Partial Checksums", Ser. No. 10/600,382, entitled "Heterogeneous Multi-Level Extendable Indexing For General Purpose Annotation Systems," and Ser. No. 10/757793 entitled "Dealing With Annotation Versioning Through Multiple Versioning Policies and Management Thereof", filed herewith, which are herein incorporated by reference in their entirety.

BACKGROUND OF THE INVENTION

1. Field of the Invention

The present invention generally relates to annotating data objects and, more particularly, to maintaining annotations across different versions of data objects.

2. Description of the Related Art

An annotation system is one where descriptive information is stored about objects, or parts of objects, as an annotation. Some annotation systems store annotations separately, without modifying the objects themselves. An annotation store, typically a database, contains information for the annotation, typically in the form of descriptive text, or other classifiers. An indexing scheme is typically used to map each annotation to the object or positions of annotated portions within the object. The annotation system may be configured to display the annotation in response to the user selecting the annotated portions of the object. For example, one common method for displaying annotations is in a flyover text box generated when a user positions a mouse pointer in proximity to the annotated portion or portions of the object.

The annotations themselves may serve different functions for different applications. For example, for some applications, annotations may serve as an interactive help system, providing description of the functionality, or explain the use of the annotated object. As an example, in a business application, an annotation may explain the use of an economic performance parameter, such as a current year's revenue by division. For other applications, annotations may serve to provide expert feedback, comments, or clarifications from a reviewer or a creator of a document or other data object. As examples, the creator of a document may insert an annotation highlighting the relevance of a certain piece or group of data, while a reviewer of the same document may insert an annotation with instructions for revising the document, possibly to correct an error.

A challenge is presented, however, when an annotated document is changed, for example, creating a new version of the document. A policy should be established that determines how annotations should be maintained for different versions of a document. One approach is to apply a "no-change" policy on the document, whereby annotations are maintained for the original document only and do not apply to subsequent versions. While this approach is simple, there may be many cases where at least some annotations would apply to a subsequent version of a document, such as when the particular portion described by the annotation has not changed. Therefore, another approach would be to "carry-forward" annotations to subsequent versions of a document. However, in some cases, some of the annotations may no longer apply, such as when an annotated portion of the document is edited to render the annotation invalid or deleted entirely. Further, even if the annotation does apply to the new version, annotation indexes indicating the corresponding annotated portions of the document may need to be updated to reflect the changes in the document.

Thus, each of these policies has drawbacks and using either alone provides a less than ideal solution. Accordingly, there is a need for an annotation system that supports multiple policies for maintaining annotations after changes to an annotated source document, for example, allowing an annotation author to select one or more policies that best fit a particular situation.

SUMMARY OF THE INVENTION

The present invention generally is directed to a method, system and article of manufacture for annotating multiple versions of a document.

One embodiment provides a method for managing annotations. The method generally includes detecting one or more changes to a document having at least one annotation corresponding to at least one portion of the document prior to occurrence of the one or more changes, determining if the at least one annotation should be applied to the document as changed, and if so, updating an annotation record containing the at least one annotation to reflect the one or more changes to the document.

Another embodiment provides a method generally including receiving a document to be checked into a content management system, the document having at least one annotation corresponding to an annotated portion thereof, wherein one or more changes to the document have been made subsequent to creation of the annotation, determining if the annotation should be applied to the document as changed, and if so, updating an annotation record containing the at least one annotation to reflect the one or more changes to the document.

Another embodiment provides a computer-readable medium containing a program. When executed by a processor, the program performs operations generally including detecting one or more changes to a document having at least one annotation corresponding to at least one portion of the document prior to the one or more change, determining if an annotation corresponding to at least one annotated portion of the document prior to the change should be applied to the document as changed, and if so, updating an annotation record containing the at least one annotation to reflect the one or more changes to the document.

Another embodiment provides a system generally including at least one application, a content management system for managing a plurality of documents manipulated by the at least one application, an annotation database for holding annotation records, each containing annotation data related to one or more of the plurality of documents, and an annotation maintenance component. The annotation maintenance component is generally configured to detect changes to a document managed by the content management system, the document having at least one annotation corresponding to an annotated portion thereof, wherein one or more changes to the document have been made subsequent to creation of the annotation, determine if the annotation should be applied to the document as changed, and, if so, update an annotation record containing the at least one annotation to reflect the one or more changes to the document.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a table illustrating exemplary policies for maintaining annotations for multiple versions of a document.

DETAILED DESCRIPTION OF THE PREFERRED EMBODIMENTS

Figure 1:
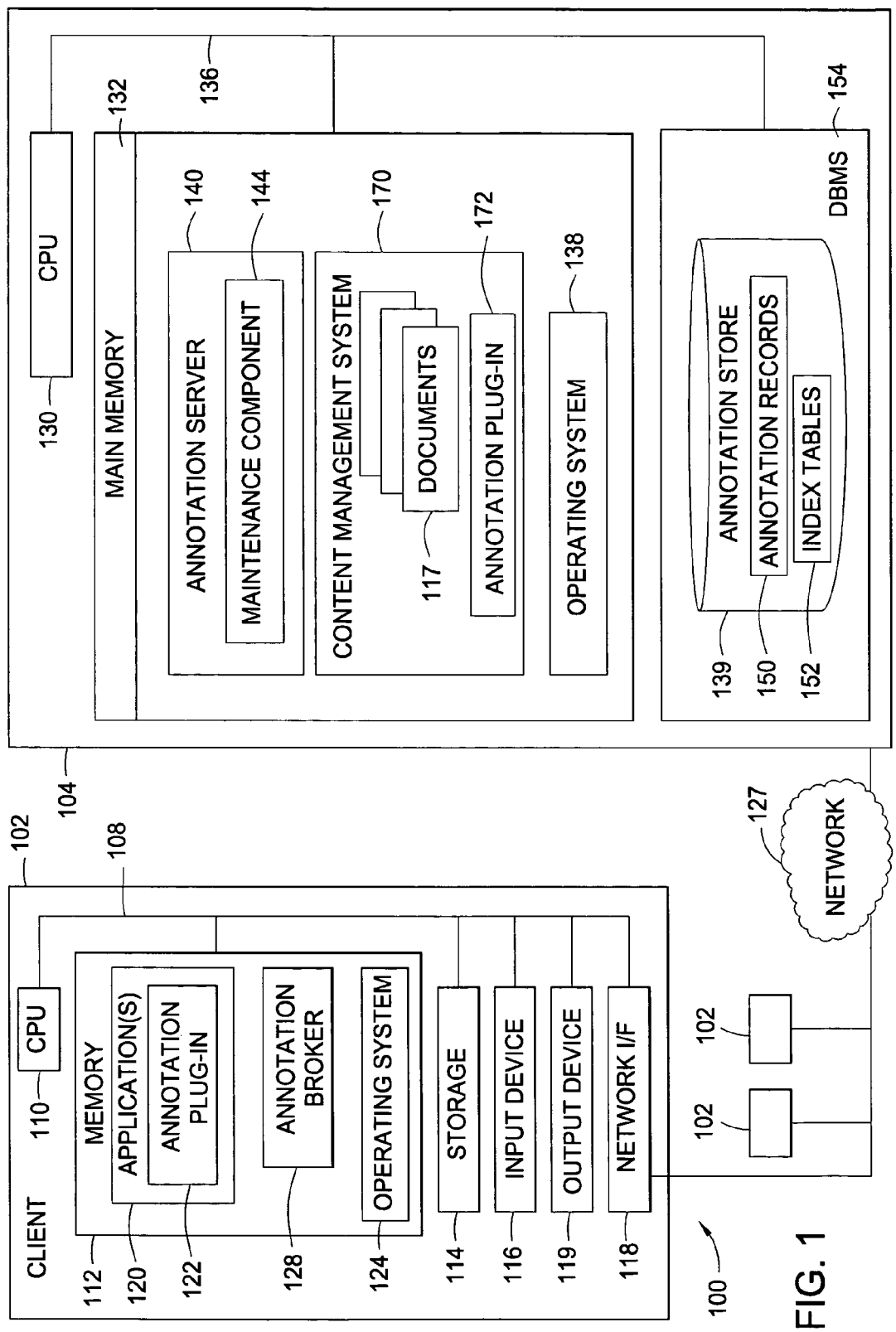
FIG. 1 is a computer system illustratively utilized in accordance with embodiments of the present invention.

The present invention provides methods, systems, and articles of manufacture for maintaining annotations for changing source documents. For some embodiments, an annotation system may support multiple policies, with each policy dictating how (or if) an annotation created for a version of a source document should be applied to subsequent versions of the source document. A user creating an annotation may select from a group of available policies to be applied to the annotation. For some embodiments, policies may be enforced when annotated documents are checked into a content management system used to manage the annotated documents.

As used herein, the term document generally refers to any type of content containing data object including, but not limited to, text documents, spreadsheets, schematics, images, media files, and the like. The term version, when applied to a document, merely refers to the content of the document at a corresponding time and does not imply that multiple versions of a document necessarily exist at any time. In other words, a subsequent version of a document may exist without of previous version still existing. Further, there is no implication that different versions of a document will have a common file name with version appended (e.g., v2, v3, etc.). Accordingly, a document modified and saved with an entirely different name may still constitute a different version of the document.

As used herein, the term annotation generally refers to any type of descriptive information associated with one or more data objects. Annotations may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation. Accordingly, it should be understood that the following techniques described with reference to textual annotations may also be applied to other types of annotations, as well, and, more generally, to any type of reference to a data object.

As used herein, the term change detection value generally refers to any numerical, derived, or filtered value, regardless of length, generated by an algorithm performed on portions of data to encode, detect changes in, or validate completeness of the portions of data. Any suitable algorithm may be used to generate the change detection value, including, but not limited to, simple summing algorithms and more complex algorithms, such as cyclic redundancy check (CRC) algorithms and MD5 filtering functions commonly used to generate checksums. Further, a change detection value may be larger than the portions of data or the portions of data may be used as a change detection value. While a change detection value may be all of these, to facilitate understanding, embodiments of the present invention may be described with reference to a checksum as a particular, but not limiting, example of a change detection value. Accordingly, the following references to checksums may be applied to change detection values in general.

Further, as used herein, the term user may generally apply to any entity utilizing the annotation system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

One embodiment of the invention is implemented as a program product for use with a computer system such as, for example, the enterprise system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Environment

FIG. 1 illustrates a client-server view of an exemplary system 100 in which an annotation system in accordance with the present invention may be utilized to exchange information, captured in the form of annotations, between users collaborating on a project. For some embodiments, the annotation system utilized in the system 100 may be similar in operation to an annotation system described in the commonly owned, co-pending application Ser. No. 10/600,014, entitled "Universal Annotation Management System."

As illustrated, the system 100 generally includes one or more client computers 102 (e.g., user workstations) and at least one server computer 104. The client computers 102 and server computer 104 may be connected via a network 127. In general, the network 127 may be any combination of a local area network (LAN), a wide area network (WAN), wireless network, or any other suitable type network, including the Internet.

As illustrated, the client computers 102 generally include a Central Processing Unit (CPU) 110 connected via a bus 108 to a memory 112, storage 114, input devices 116, output devices 119, and a network interface device 118. The input devices 116 may be any devices to give input to the client computer 102, such as a mouse, keyboard, keypad, light-pen, touch-screen, track-ball, or speech recognition unit, audio/video player, and the like. The output devices 119 may be any suitable devices to give output to the user, including speakers and any of various types of display screen. Although shown separately from the input device 116, the output device 119 and input device 116 could be combined (e.g., a display screen with an integrated touch-screen.

The network interface device 118 may be any entry/exit device configured to allow network communications between the client computer 102 and the server computer 104 via the network 127. For example, the network interface device 118 may be a network adapter or other network interface card (NIC). Storage 114 is preferably a Direct Access Storage Device (DASD). Although shown as a single unit, storage 114 may be any combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips. Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing at least one application 120 (optionally shown with an associated annotation plug-in 122 and an annotation broker 128). The application 120 may be any of a variety of applications used to manipulate (e.g., create, view, and/or edit) documents 117. For example, the application 120 may be a text editor/word processor used to manipulate annotatable documents, a document generator/viewer (such as Adobe's Acrobat® and Acrobat Reader) used to manipulate documents, or data analysis software, such as Decision Site available from Spotfire, Inc., imaging software used to manipulate images, and any other types of applications used to manipulate various types and forms of data that may be embodied in documents 117. The documents 117 may be stored in a separate data store than annotations describing them. Different versions of documents 117 may exist at any given time. As described herein, a number of different "annotation versioning" policies may be available to determine how annotations originally made for one version of a document 117 may be applied to subsequent versions of the same document 117.

As illustrated, for some embodiments, documents 117 manipulated by the application 120 may be managed by a content management system 170. In such embodiments, enforcement of annotation versioning policies may be coordinated with the content management system 170 (e.g., via an annotation plug-in 172), for example, when modified documents (checked out from the content management system 170) are checked back in. By providing a central location from which annotated documents 117 are accessed, the content management system 170 may greatly facilitate annotation versioning policy enforcement.

Some application programs 120 may be configured to communicate with the annotation server 140 directly, for example, via a set of application programming interface (API) functions (not shown) provided for the annotation server 140. As used herein, the term API generally refers to any set of interface functions (e.g., implementing any suitable inter-process protocol) that may be used to communicate between a client computer or process and a server computer or process. Other application programs, however, may communicate with the annotation server 140 via plug-in components 122 and/or the annotation broker 128 (e.g. also via API functions). In other words, annotation capability may be added to an existing application 120 via the plug-in components 122. The plug-in components 122 may, for example, present graphical user interface (GUI) screens to users of applications 120, thus allowing the creation and retrieval of annotations from within the applications used to manipulate the annotated data.

The annotation broker 128 is an optional component and may be implemented as a software component configured to present a standard interface to the annotation server 140 from various applications 120, for example, communicating with plug-in components 122 from multiple applications running on the same client computer 102. Hence, the annotation broker 128 may provide a degree of separation between the applications 120 and the annotation server 140, hiding detailed operation of the annotation server 140 and facilitating development of plug-in components 122. In other words, new applications 120 may be supported through the development of plug-in components 122 written in accordance with the annotation broker interface.

Components of the server computer 104 may be physically arranged in a manner similar to those of the client computer 102. For example, the server computer 104 is shown generally comprising a CPU 135, a memory 132, and some type of storage system, such as a database management system (DBMS) 154, coupled to one another by a bus 136, which may all functions as similar components described with reference to the client computer 102. The server computer 104 is generally under the control of an operating system 138 (e.g., IBM OS/400®, UNIX, Microsoft Windows®, and the like) shown residing in memory 132. As illustrated, for some embodiments, the server computer 104 may be configured with a content management system 170, such as IBM's Content Manager, generally configured to manage documents 117.

As illustrated, the server computer 104 may also be configured with the annotation server 140, also shown residing in memory 132. The annotation server 140 provides annotation clients (e.g., running on one or more client computers 102) with access to the annotation store 139, for example, via annotation API functions. In other words, the annotation API functions generally define the interface between annotation clients and the annotation server 140. As used herein, the term annotation client generally refers to any user interface (or other type front-end logic) of the annotation system that communicates with the annotation server to manipulate (e.g., create, update, read and query) annotation data. Examples of annotation clients include applications 120 communicating with the annotation server 140 (directly, or via plug-in components 122) or an external application, such as an annotation browser (not shown).

The annotation server 140 may be configured to perform a variety of operations, such as responding to requests to create annotations for specified data objects, formulating and issuing queries against the annotation store 139 to search for annotations for a specified data object, and formulating and issuing queries against the annotation store 139 to search for annotations satisfying one or more specified conditions (e.g., having a specified author, creation date, content, and the like). The annotations may be contained in annotation records 150, for example, stored in an annotation database 139.

The annotation records 150 may also contain various information about the annotation, such as the author and creation date of the annotation, as well as an index identifying annotated portions of documents 117. For some embodiments, the annotation server 140 may include an indexing component (shown in FIG. 2) configured to generate an index for an annotated data object, for example, based on one or more parameters identifying the annotated data object (e.g., a database table, row, and/or column). Indexes created for annotated portions of documents 117 may be stored in an index table 152 in the annotation data store 139. For some embodiments, the index table 152 may be queried to identify annotations for documents 117.

As illustrated, the annotation server 140 may have an associated maintenance component 144 generally configured to maintain annotations for documents 117. As will be described in greater detail below, the annotation maintenance component 144 may play a role in implementing and enforcing policies for maintaining annotations when changes are made to annotated documents 117.

Figure 2:
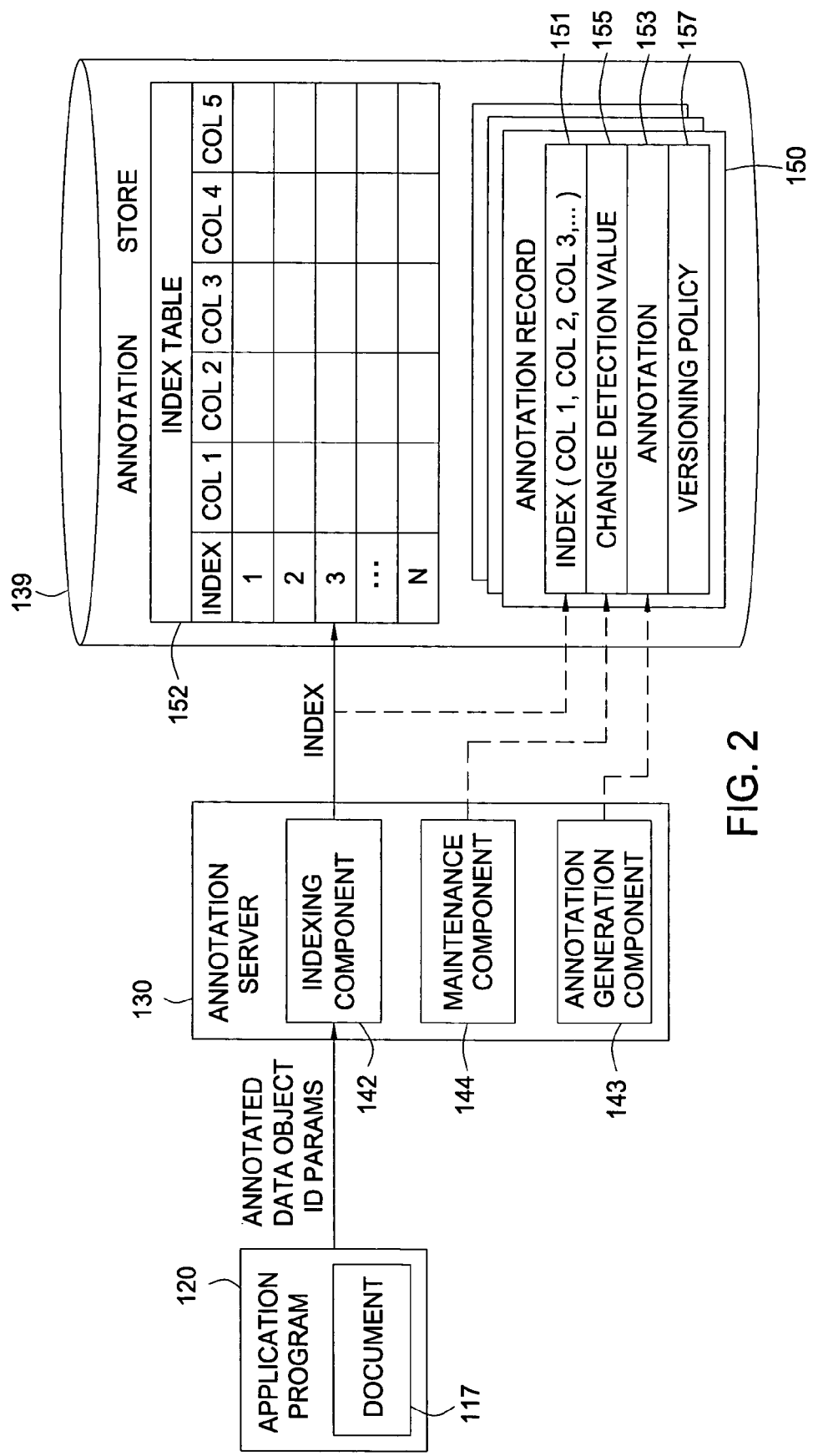
FIG. 2 is a relational view of software components according to one embodiment of the present invention.

FIG. 2 is a relational view of software components, including the annotation maintenance component 144, according to one embodiment of the present invention, shown during annotation generation. As illustrated, an annotation 153 for a portion of a document 117 (identified by a set of ID parameters) may be created via an annotation generation component 143. An indexing component 142 may create an index 151 based on the set of ID parameters, for use in indexing the annotation 153 created for the identified data object. In general, an index 151 points to the annotated portion or position within a corresponding annotated document 117.

A corresponding entry for the index 151 may be placed in the index table 152, allowing the index table 152 to be queried to identify documents and portions of documents having corresponding annotations. For some embodiments, entries in the index table 152 may simply contain ID parameters indicating an annotated data object (e.g., identification of a data source/table, a row, and column). For other embodiments, however, table entries may include index parameters generated based on the ID parameters. Such indexing techniques are described in the commonly assigned, co-pending application Ser. No. 10/600,382, entitled "Heterogeneous Multi-Level Extendable Indexing For General Purpose Annotation Systems," filed Jun. 20, 2003.

The annotation maintenance component 144 may also generate a change detection value 155 (e.g., a checksum or hash value, such as MD5) for the annotated document or annotated portion of the document, to be stored in the annotation record 150. The annotation maintenance component 144 may detect changes in a document 117 or portion of a document 117 associated with an annotation by generating a new change detection value and comparing it to the change detection value stored in the corresponding annotation record 150. The generation and use of change detection values is described in detail in the commonly assigned, co-pending application Ser. No. 10/310,192, entitled "Annotation Validation Using Partial Checksums." In response to detecting a change to an annotated document 117, the annotation maintenance component 144 may delete, modify (e.g. update an index 151), or maintain the annotation record 150 as-is, depending on a type of policy selected for maintaining annotations for different versions of documents 117.

Exemplary Annotation Versioning Policies

FIG. 3 shows a table 300 illustrating exemplary policies for maintaining annotations for multiple versions of a document (hereinafter "annotation versioning policies" or simply "policies"). The policies may be applied at the annotation level, the document level, or some combination of both. In other words, in some cases, annotation policies may be set from within a document (or application used to manipulate that document), and applied to all annotations created for that document. In some cases, annotation policies may be set when an annotation is created. In some cases, a default policy may be set at the document level, which may be changed when creating an annotation.

In any case, the first policy shown in table 300 is a "no-change" policy dictating that annotations stay with the original version of a document for which they were created and do not apply to subsequent versions. In other words, if a document is changed, the old annotation does not apply to the new document. Indexes to the original document apply to the annotation, while indexes in the new document do not. Content of the annotation may be changed, with the changed content applying to the same version document as the original content.

The second policy shown in table 300 dictates that annotations are applied to multiple versions of a document. An annotation on an original document also points to subsequent (changed) versions of the document. In other words, a user would see the same annotation whether viewing the old or a newer version of the document. If a change is made to the annotation content, the change in annotation content will appear whether the old or newer version of the document is displayed. While this may cause confusion if the changes to the source document are large and varied, it may be a preferred policy in some cases. For example, there may be cases where an annotation captures a general insight regarding a topic addressed in an annotated portion. As such, the annotation is likely to remain valid regardless of changes to the annotated document or the annotated portion of the document.

A third policy shown dictates that for each changed version of a document, each annotation is carried forward to the most accurate position in the document. In other words, multiple copies of annotation records 150 may exist for each annotation, with the index of each subsequent copy updated to reflect the changes between versions. For some embodiments, indexes may be updated automatically (e.g., an application may scan a document to identify an originally annotated portion in a subsequent version). In some cases, however, an originally annotated portion may not be readily identified in a subsequent version, due to the magnitude of changes or deletion. As a result, in some cases, this approach may lead to annotations being carried forward regardless of semantic and contextual correctness.

Therefore, for some embodiments, a user may specify that annotations must be validated (by someone with authority) before they are carried forward to new versions of a document. This policy (last in table 300) may be applicable in an environment where the person who makes the changes to the document also has authority to see and determine the applicability of a previous annotation to the changed document. This policy may be used in conjunction with the second or third policies. A related policy may dictate that annotations viewed from a different version of a document (e.g., other than the version for which it was created) should be marked as unverified indicating it was carried forward but has not been formally approved, effectively putting a viewer on notice they must determine whether the annotation still applies. An authorized user, such as the original author of the annotation, may re-verify the annotation, resulting in removal of the unverified marking.

It should be understood that the listed policies are exemplary only and that different embodiments of annotation systems may support more, less, or different policies than those listed. Further, as will be described below, some of the listed policies may be combined. Policies may also be added and removed from the system, for example, according to customer or administrative needs. An administrator of the system may select one or more policies to make available to users during system configuration and may also indicate a default policy. Users may also be allowed to set their own policy from the set of available policies. In other words, a user creating an annotation may select from whatever policies are allowed to apply to their annotation.

Figure 4:
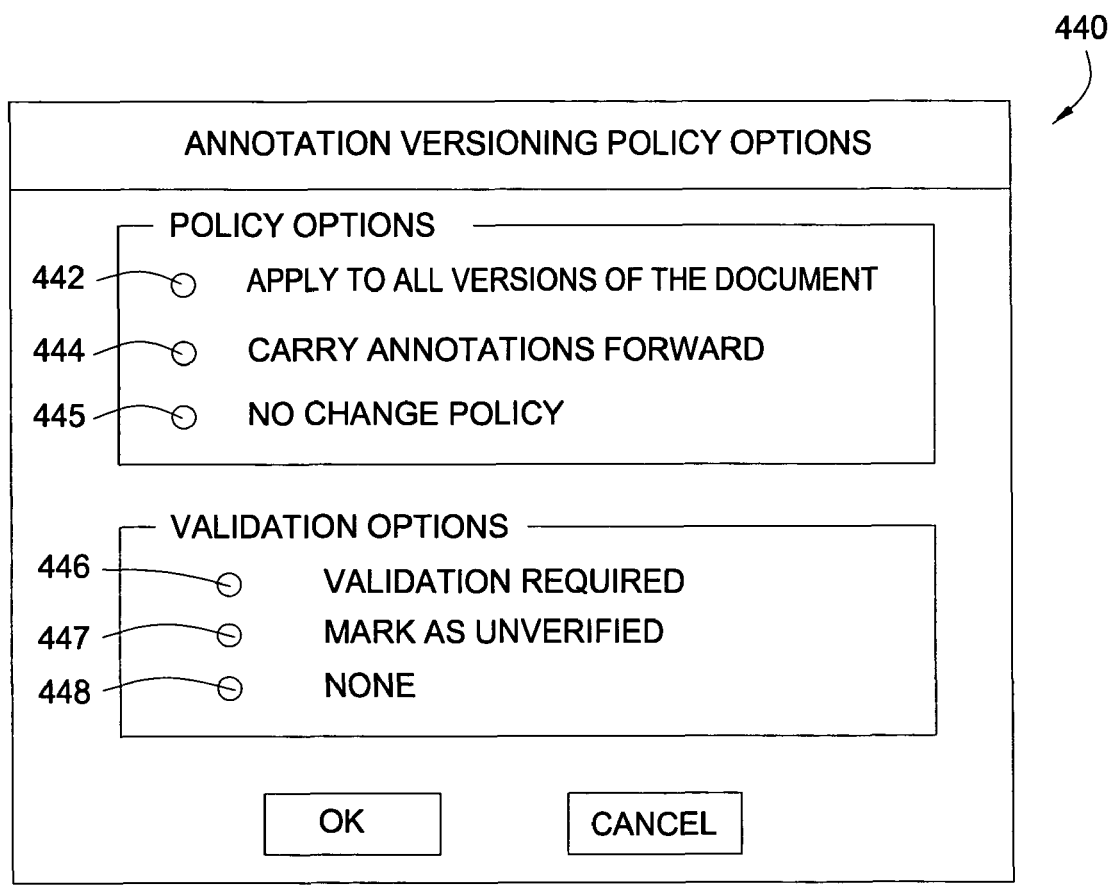
FIG. 4 illustrates an exemplary graphical user interface (GUI) screen according to one embodiment of the present invention.

For example, FIG. 4 illustrates an exemplary graphical user interface GUI screen 440 that may be used to select a policy for applying an annotation to subsequent versions of the document. The GUI screen 440 may be accessed, for example, from an application 120 to set an annotation policy at the document level (e.g., to be applied to all annotations created for that document) or at an annotation level (e.g., to be applied only to an annotation), for example, when creating an annotation.

As illustrated, the GUI screen 440 may allow, the user (via radio buttons 442, 444, and 445) to specify whether the annotation should be applied to all versions of the document (i.e., the second policy of table 300), carried forward to subsequent versions of the document (i.e., the third policy of table 300), or applied only to the original annotated version of the document (i.e., the first policy of table 300), respectively. Further, a number of validation option may be specified if the annotation is applied or carried forward to subsequent versions. For example, a user may specify (via radio buttons 446, 447, and 448, respectively) that validation may be required prior to carrying the annotation forward to subsequent versions, that the annotation may be carried forward automatically and marked as unverified, or neither. As will be described in greater detail below, if user validation is required, the annotation maintenance component may be configured to notify the user (e.g., via e-mail, instant message, or other type of notification technique) in the event a change to the annotated document is detected.

Annotation Versioning Policy Enforcement

In some business enterprises, a content management system is used to manage a wide variety of content (generically referred to herein as documents) accessible to and accessed by a number of users. For example, referring back to FIG. 1, a content management system 170 may manage documents 117 accessed by a number of users of the system 100. In systems utilizing such content management systems, documents are checked out by users to be viewed or modified and checked back in when the user is through viewing or modifying the document. The content management system typically tracks changes and maintains multiple versions of the documents.

Figure 5:
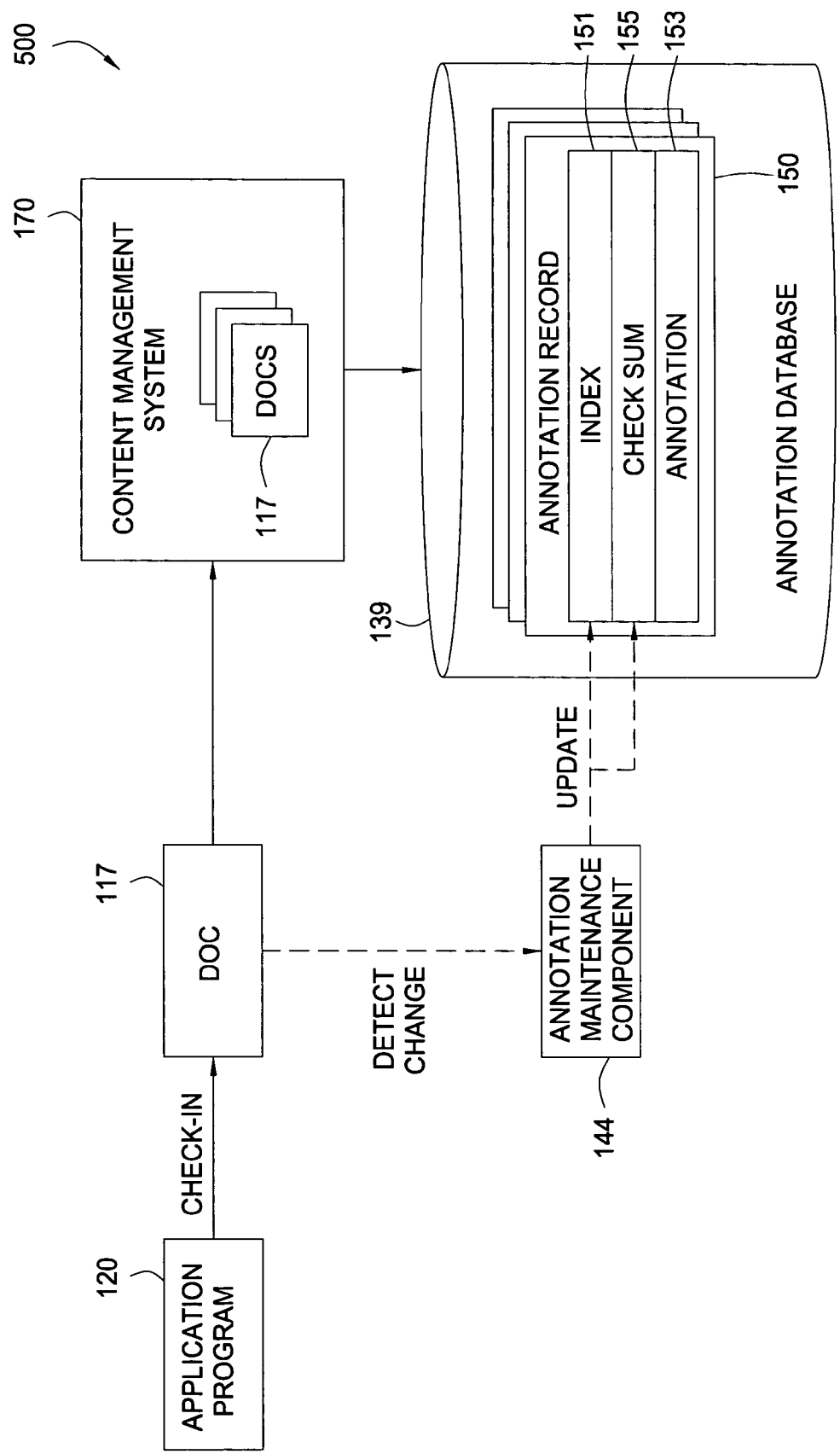
FIG. 5 is another relational view of software components according to one embodiment of the present invention.

For some embodiments, annotation versioning policies may be enforced in conjunction with a content management system (e.g., when an annotated document is checked back into the content management system). For example, FIG. 5 illustrates a relational view of software components of a system 500 in which an annotation maintenance component 144 enforces annotation versioning policies as annotated documents 117 are checked back into a content management system 170.

Figure 6:
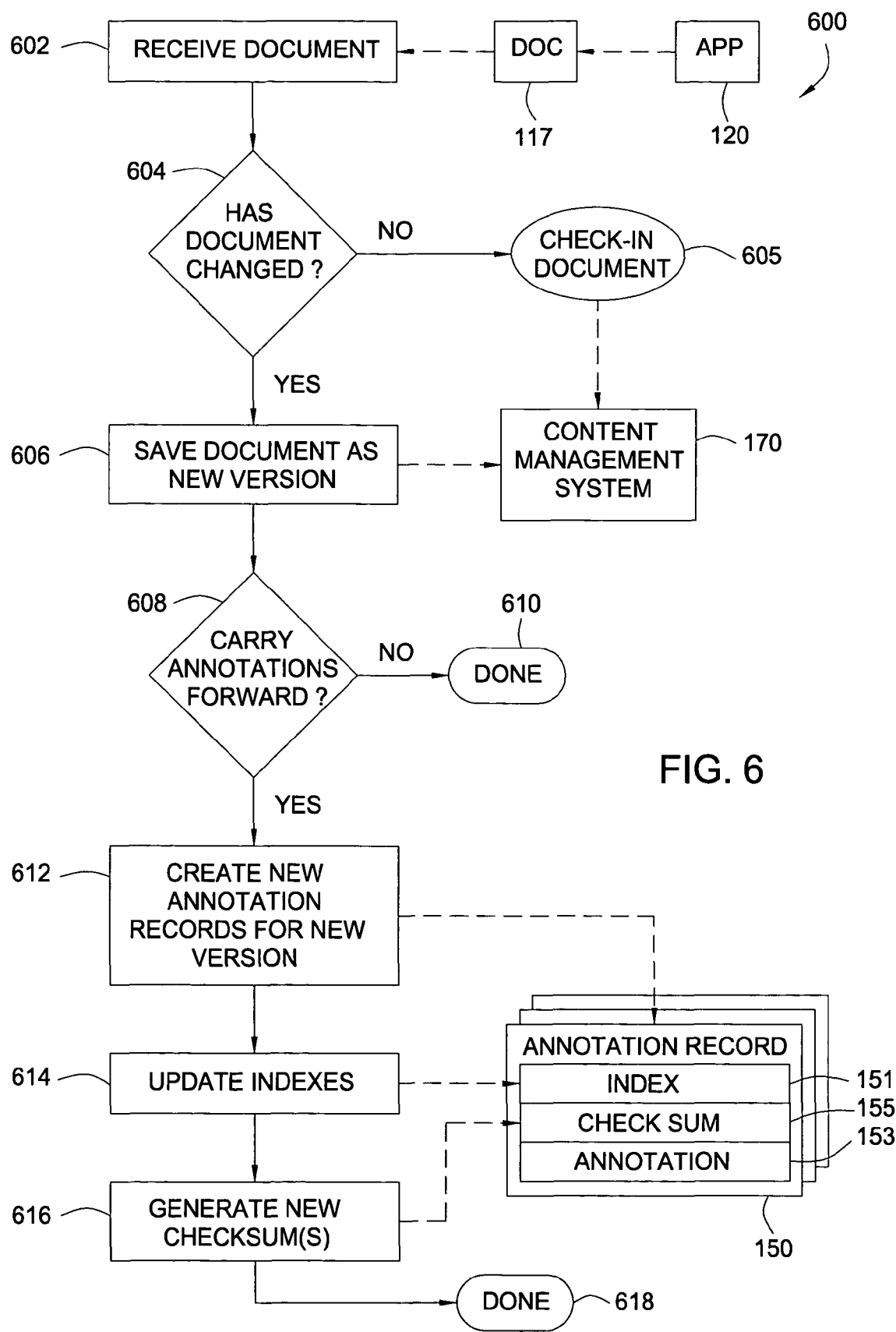
FIG. 6 is a flow chart illustrating exemplary operations for maintaining annotations for multiple versions of a document according to one embodiment of the present invention.

Operation of the system 500 may be described with reference to FIG. 6, which illustrates a flow chart of exemplary operations 600 that may be performed, for example by the annotation maintenance component 144 and/or content management system 170, to maintain annotations for multiple versions of documents according to one embodiment of the present invention. For example, in some cases, the annotation maintenance component 144 may be integrated with the content management system 170, for example, as a plug-in component.

The operations 600 begin, at step 602, by receiving a document 117, for example, by the annotation maintenance component 144, to be checked into the content management system 170. At step 604, a determination is made as to whether the document has changed, for example, by comparing a change detection value 155 stored in a corresponding annotation record 150 with a changed detection value calculated for the document 117. If the document 117 has not changed, it is checked into the content management system 170, at step 605.

If the document 117 has changed, the document 117 is saved as a new version (or at least the revised document 117 is saved), at step 606. At step 608, a determination is made as to whether annotations are to be carried forward to the new version of the document 117. If not, the operations 600 are exited, at step 610. If annotations are to be carried forward to the new version of the document 117, new annotation records 150 for the new version of the document are created (or existing annotation records 150 are updated) at step 612. At step 614, the annotation indexes 151 are updated to refer positions in the new version of the document 117 and a new change detection value 155 is generated for the new version of the document, at step 616.

Depending on the annotation versioning policy selected (e.g., by the annotation author), the annotation maintenance component 144 may carry annotations forward to refer to their respective positions within a document 117 when that document 117 changes. For example, after the revised document 117 has been saved in the content management system 170, the annotation maintenance component 144 may then create and store new annotation records (with indexes referring to the revised document 117) in the annotation store 139. As previously described, the annotation maintenance component may update the corresponding index 151 to reflect the revised document and update the change detection value 155 (illustratively shown as a checksum) to reflect revisions to the annotated document 117 or the corresponding annotated portion thereof.

Figure 7:
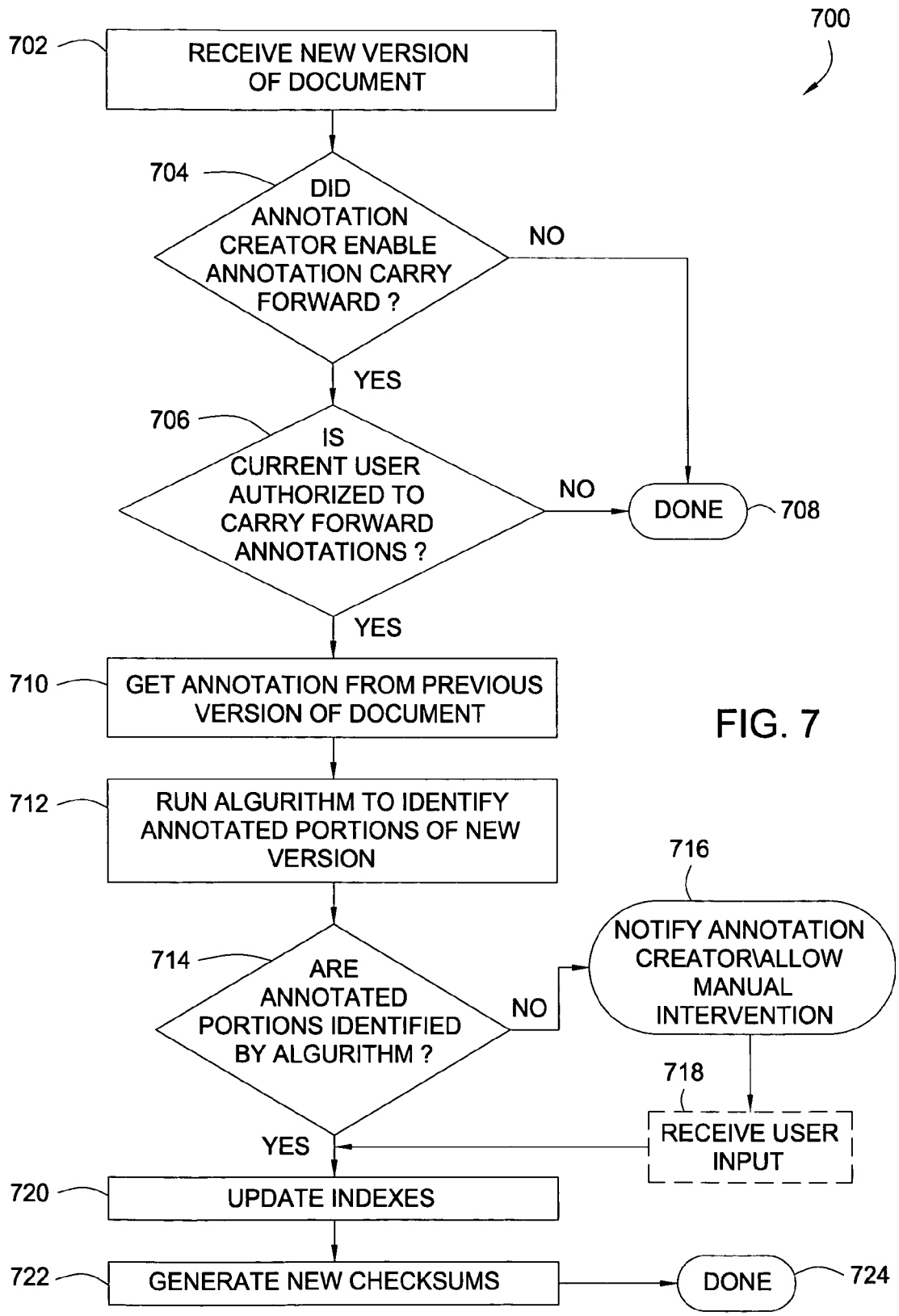
FIG. 7 is a flow chart illustrating exemplary operations for enforcing annotation maintenance policies according to one embodiment of the present invention.

As previously described with reference to FIGS. 3 and 4A-4D, exactly when and how annotations are carried forward (e.g., steps 612-616 of FIG. 6) may depend on options a user selected when creating the annotation and whether a current user (is authorized. In some cases, annotation records may be automatically created/updated or user interaction may be required, in some instances. FIG. 7 illustrates a flow diagram of exemplary operations 700 that illustrate how and when an annotation may be carried forward and when user interaction may be sought, for example, based on options selected creator or author of the original annotation.

The operations 700 begin, at step 702, by receiving a document 117. At step 704, a determination is made as to whether the annotation creator enabled annotation carry forward, for example, via check box 424 of FIG. 4B. If so, a determination is then made, at step 706, as to whether a current user (e.g., a user checking in the document 117) is authorized to carry forward annotations. For example, depending on the system settings, only users operating in certain roles may be authorized to carry annotations forward. If the current user is not authorized to carry annotation forward, the operations are exited, at step 708, for example, by checking in the document 117 without carrying annotations forward.

If the user is authorized to carry annotations forward, annotations from previous versions of the document are retrieved, at step 710. As previously described, for some embodiments, the annotation maintenance component 144 may be configured to automatically update indexes to refer to annotated portions of a revised document. Therefore, at step 712, an algorithm is run to identify (previously) annotated portions in the new version of the document 117. For example, the algorithm may employ pattern matching, searching the new version of the document 117 for annotated portions from the previously annotated version of the document 117. If the annotated portions are identified by the algorithm (step 714), the indexes are automatically updated, at step 720 and new change detection values are generated at step 722, prior to exiting the operations 700, at step 724.

If the algorithm did not identify the annotated portions in the new version of the document 117, a user (e.g., the original annotation author or last user to modify the annotation) may be notified, at step 716. For example, the user may be given the opportunity to utilize a tool to manually identify the portions of the new version of the document 117 to which the annotations should be carried forward. For some embodiments, the tool may indicate to the user where the annotation may apply based on results of the algorithm (e.g., by highlighting text in the document 117, such highlighted text 405 in FIG. 4A) and lets the user carry the annotations forward to the new version of the document 117. Input from the user (e.g., a manual selection indicating annotated portions in the new version of the document 117) may be received, at step 718, and used to update the indexes at step 720.

As previously described, user input may also be required if the creator of the annotation specified that validation is required for carrying an annotation forward (e.g., by the annotation author or other authorized user). In any case, a user may be able to check out a document from the content management system 170 while the carrying forward of annotations related to the document is pending another user's actions to carry it forward (e.g., validation or identification of the annotated portions in a new version). In such cases, the user checking out the document may be notified that there are pending changes to be made for annotations related to the document. Further, as previously described, annotations for such a document may be marked as unverified while the changes are pending.

Conclusion

By supporting multiple policies for applying annotations to different versions of documents, users may be able to select a policy that best fits their needs and gain some level of assurance the annotations will be properly applied as the document changes. For systems utilizing a content management system, enforcing such policies when a document is checked in may facilitate detecting changes to documents, or annotated portions thereof, and allow corresponding annotation indexes to be updated to reflect changes to the document. As a result, multiple users accessing a shared set of documents may be assured that annotations for the documents are valid and apply to the current versions of the documents.

While the foregoing is directed to embodiments of the present invention, other and further embodiments of the invention may be devised without departing from the basic scope thereof, and the scope thereof is determined by the claims that follow.

What is claimed is:

1. A method for managing annotations comprising:
   detecting one or more changes to a document having at least one annotation corresponding to at least one portion of the document prior to occurrence of the one or more changes;
   determining if the at least one annotation should be applied to the document, as changed, based on whether one of a set of one or more policies determining how annotations should be applied to different versions of the same document has been selected; and
   if so, updating an annotation record based on the one or more changes to the document.

2. The method of claim 1, wherein updating the annotation record comprises updating an index indicating an annotated portion of the document.

3. The method of claim 1, wherein updating the annotation record comprises updating one or more indexes to refer to multiple versions of the document.

4. The method of claim 1, wherein updating an annotation record containing the at least one annotation to reflect the one or more changes to the document comprises:
   copying an existing annotation record referring to the document prior to the one or more changes; and
   updating the annotation record copied to reflect the one or more changes to the document.

5. The method of claim 1, wherein detecting one or more changes to the document comprises comparing change detection values generated for the at least one annotated portion of the document prior to and after the one or more changes.

6. The method of claim 5, wherein the change detection values are hash values generated for the at least one annotated portion of the document prior to and after the one or more changes.

7. The method of claim 1, further comprising, prior to updating the annotation record:
notifying a user the document has changed; and
receiving validation from the user that the annotation should be applied to the document as changed.

8. A method comprising:
receiving a document to be checked into a content management system, the document having at least one annotation corresponding to an annotated portion thereof, wherein one or more changes to the document have been made subsequent to creation of the annotation;
determining if the annotation should be applied to the document as changed, by determining whether a creator of the annotation specified the annotation should be applied to subsequent versions of the document; and
if so, updating an annotation record containing the at least one annotation based on the one or more changes to the document.

9. The method of claim 8, wherein determining if the annotation should be applied to the document as changed comprises determining whether a creator of the annotation specified the annotation should be applied to subsequent versions of the document by selecting a policy from a set of policies that determine how annotations should be applied to subsequent versions of the document.

10. The method of claim 9, further comprising:
determining if the user selected a policy that specifies that validation should occur prior to updating an annotation record containing the at least one annotation to reflect the one or more changes to the document;
if so, prompting a user for such validation; and
updating the annotation record only after receiving such validation.

11. The method of claim 8, wherein updating an annotation record containing the at least one annotation to reflect the one or more changes to the document comprises:
running an algorithm to identify the annotated portion of the document corresponding to the at least one annotation in the document as changed; and
if the annotated portion is identified by the algorithm, updating the annotation record based on results of running the algorithm.

12. The method of claim 11, further comprising, if the annotated portion is not identified by the algorithm:
prompting a user to identify the annotation portion in the document, as changed; and
updating the annotation record based on input received from the user.

13. A non-transitory computer-readable medium containing a program which, when executed by a processor, performs operations comprising:
detecting one or more changes to a document having at least one annotation corresponding to at least one portion of the document prior to the one or more change;
determining if an annotation corresponding to at least one annotated portion of the document prior to the change should be applied to the document, as changed, based on whether one or more of a set of one or more policies determining how annotations should be applied to different versions of the same document has been selected; and
if so, updating an annotation record containing the at least one annotation to based on the one or more changes to the document.

14. The non-transitory computer-readable medium of claim 13, wherein updating the annotation record comprises updating an index indicating an annotated portion of the document.

15. The non-transitory computer-readable medium of claim 13, wherein updating the annotation record comprises updating generating a change detection value for the document, or a portion of the document, to reflect the one or more changes.

16. The non-transitory computer-readable medium of claim 13, wherein updating an annotation record containing the at least one annotation to reflect the one or more changes to the document comprises:
copying an annotation record referring to the document prior to the one or more changes; and updating the annotation record copied to reflect the one or more changes to the document.

17. A system comprising:
at least one application;
a content management system for managing a plurality of documents manipulated by the at least one application;
an annotation database for holding annotation records, each containing annotation data related to one or more of the plurality of documents; and
an annotation maintenance component configured to detect changes to a document managed by the content management system, the document having at least one annotation corresponding to an annotated portion thereof, wherein one or more changes to the document have been made subsequent to creation of the annotation, determine if the annotation should be applied to the document as changed based on whether one or more of a set of one of more policies determining how annotations should be applied to different versions of the same document has been selected, and, if so, update an annotation record containing the at least one annotation based on the one or more changes to the document.

18. The system of claim 17, wherein the annotation maintenance component is configured to update an annotation record containing the at least one annotation to reflect the one or more changes to the document by updating an annotation index stored in the annotation record.

19. The system of claim 17, wherein the annotation maintenance component is configured to update an annotation record containing the at least one annotation to reflect the one or more changes to the document by updating a change detection value stored in the annotation record.

20. The system of claim 17, wherein the annotation maintenance component is integrated with the content management system.

* * * * *